US008933802B2

United States Patent
Baade (10) Patent No.: US 8,933,802 B2
(45) Date of Patent: Jan. 13, 2015

(54) SWITCH AND ACTUATOR COUPLING IN A CHASSIS OF A CONTAINER ASSOCIATED WITH AN INTERMODAL FREIGHT TRANSPORT SYSTEM

(71) Applicant: Levi Marshall Baade, San Clemente, CA (US)

(72) Inventor: Levi Marshall Baade, San Clemente, CA (US)

(73) Assignee: Spireon, Inc., Knoxville, TN (US)

( * ) Notice: Subject to any disclaimer, the term of this patent is extended or adjusted under 35 U.S.C. 154(b) by 135 days.

(21) Appl. No.: 13/668,698

(22) Filed: Nov. 5, 2012

(65) Prior Publication Data

US 2014/0125500 A1    May 8, 2014

(51) Int. Cl.
*G08B 13/08*    (2006.01)

(52) U.S. Cl.
USPC ............... 340/539.13; 340/426.19; 340/989; 340/991; 701/468; 705/14.63

(58) Field of Classification Search
USPC ........ 340/989, 991, 426.19, 539.13; 701/468; 705/14.63
See application file for complete search history.

(56) References Cited

U.S. PATENT DOCUMENTS

| | | | |
|---|---|---|---|
| 5,917,433 A * | 6/1999 | Keillor et al. ................ 340/989 |
| 7,154,390 B2 * | 12/2006 | Giermanski et al. ...... 340/539.22 |
| 2010/0071572 A1 * | 3/2010 | Carroll et al. ............. 100/229 A |
| 2010/0127867 A1 * | 5/2010 | Chien et al. ................ 340/545.6 |
| 2011/0181391 A1 * | 7/2011 | Chu .............................. 340/8.1 |

* cited by examiner

Primary Examiner — Brent Swarthout
(74) Attorney, Agent, or Firm — Raj Abhyanker, P.C.

(57) ABSTRACT

A method and system of switch and actuator coupling in a chassis of a container associated with an intermodal freight transport system is disclosed. According to one embodiment, a method of a tracking system involves coupling a first switch of a chassis to a second actuator of a container and coupling a first actuator of the chassis to a second switch of the container when the container is placed on the chassis, and signaling a wake event to a container tracking device when the first switch and the first actuator of the chassis is coupled with the second actuator and the second switch of the container. The method may also include communicating at least one of a location data and a container identification number of the container through at least one of the container tracking device and a chassis tracking device, through a network, to an administrative server.

17 Claims, 10 Drawing Sheets

SWITCH AND ACTUATOR COUPLING IN A CHASSIS OF A CONTAINER ASSOCIATED WITH AN INTERMODAL FREIGHT TRANSPORT SYSTEM

FIELD OF TECHNOLOGY

This disclosure relates generally to the technical field of geospatial freight tracking, and in one example embodiment, this disclosure relates to a method and system of switch and actuator coupling in a chassis of a container associated with an intermodal freight transport system.

BACKGROUND

In an intermodal freight distribution business, a client may wish to track a container of a shipment of goods delivered through a land based route (e.g., by train, bus, truck). For example, the client may wish to estimate how long the shipment of containers may take to reach a destination. Furthermore, the client may wish to receive a report of an event related to a movement and/or a manipulation of the container of the shipment (e.g. loading/unloading on a freight train or tractor chassis, opening/closing of doors). Tracking devices may not work when placed on the container of the shipment because there may not be enough power during the shipment. In addition, a harsh and an inclement environment may damage any external items (e.g. tracking devices) affixed to the container.

SUMMARY

A method and system related to a switch and actuator coupling in a chassis of a container associated with an intermodal freight transport system is disclosed. In one aspect, a method of an intermodal transport tracking system includes placing a first switch and a first actuator of a housing of a chassis. The method also includes coupling the first switch of the housing of the chassis to a second actuator of a container and coupling the first actuator of the housing of the chassis to a second switch of the container when the container is placed on the chassis. Furthermore, the method includes signaling a wake event to a container tracking device when the first switch and the first actuator of the chassis is coupled with the second actuator and the second switch of the container.

The method may involve powering the container tracking device through an internal battery based on the wake event. The method may also involve activating a chassis tracking device when the first switch and the first actuator of the chassis is coupled with the second actuator and the second switch of the container. The method may also involve generating, through a global positioning system of the container tracking device and/or the chassis tracking device, a location data when the first switch and the first actuator of the chassis is coupled with the second actuator and the second switch of the container. The method may further involve reading an identification tag of the container through a reader device of the chassis to discover a container identification number when the first switch and the first actuator of the chassis is coupled with the second actuator and the second switch of the container. The method may also involve communicating the location data and the container identification number through the container tracking device and/or the chassis tracking device, through a network, to an administrative server.

The method may also involve detecting an initial movement of the chassis through the GPS of the container tracking device and/or the chassis tracking device. The method may involve determining a duration of a continuous movement of the chassis through the GPS of the container tracking device and/or the chassis tracking device. The method may also involve calculating a duration of a stationary condition of the chassis through the GPS of the container tracking device and/or the chassis tracking device. The method may also involve detecting an opening and/or a closing of a door of the container through a door sensor of the container.

The method may further involve communicating the location data and the container identification number through the container tracking device based on the opening and the closing of the door of the container. The location data and the container identification number may also be communicated through the container tracking device based on a daily location query of the container tracking device. The location data and the container identification number may be communicated through the container tracking device based on the wake event, the opening and the closing of the door, and/or the daily location query of the container tracking device. The location data and the container identification number may be communicated through the chassis tracking device based on the initial movement of the chassis, the duration of the continuous movement of the chassis, and/or the duration of the stationary condition of the chassis.

In another aspect, a method of an intermodal transport tracking system includes signaling a wake event to a container tracking device when the first switch and the first actuator of the chassis is coupled with the second actuator and the second switch of the container. The method may also involve generating, through a global positioning system (GPS) of the container tracking device and/or the chassis tracking device, a location data when the first switch and the first actuator of the chassis is coupled with the second actuator and the second switch of the container. The method may further involve reading an identification tag of the container through a reader device of the chassis to discover a container identification number when the first switch and the first actuator of the chassis is coupled with the second actuator and the second switch of the container.

The method may further involve powering the container tracking device through an internal battery of the container tracking device based on the wake event. The method may also involve activating a chassis tracking device when the first switch and the first actuator of the chassis is coupled with the second actuator and the second switch of the container. The method may also involve transmitting the location data and the container identification number through the container tracking device and/or the chassis tracking device, through a network, to an administrative server.

The method may also involve detecting an initial movement of the chassis through the GPS of the container tracking device and/or the chassis tracking device. They method may also involve determining a duration of a continuous movement of the chassis through the GPS of the container tracking device and/or the chassis tracking device. The method may further involve calculating a duration of a stationary condition of the chassis through the GPS of the container tracking device and/or the chassis tracking device. The method may also involve detecting an opening and/or a closing of a door of the container through a door sensor module of the container.

The method may further involve communicating the location data and the container identification number through the container tracking device based on the opening and the closing of the door of the container. The method may also involve communicating the location data and the container identification number through the container tracking device based on a daily location query of the container tracking device. The method may also include transmitting the location data and the container identification number through the container tracking device based on the wake event, the opening and the closing of the door, and/or the daily location query of the container tracking device. The method may further involve transmitting the location data and the container identification number through the chassis tracking device based on the initial movement of the chassis, the duration of the continuous movement of the chassis, and/or the duration of the stationary condition of the chassis.

In yet another aspect, a transport vehicle includes: a chassis having a first switch and a first actuator; a container having a second switch and a second actuator; and a container tracking device to power on when the first switch and the first actuator of the chassis are coupled with the second switch and the second actuator of the container. The container tracking device of the transport vehicle may include an internal battery. The chassis of the transport vehicle may also include a chassis tracking device to activate when the first switch and the first actuator of the chassis are coupled with the second switch and the second actuator of the container.

The transport vehicle may also include: a GPS of the container tracking device and/or the chassis to generate a location data when the first switch and the first actuator of the chassis is coupled with the second actuator and the second switch of the container; and a container reader of the chassis to read an identification tag of the container to discover a container identification number when the first switch and the first actuator of the chassis is coupled with the second actuator and the second switch of the container.

The container tracking device and the chassis tracking device of the transport vehicle may communicate with an administrative server to receive a communication comprising of the location data and the container identification number when the first switch and the first actuator of the chassis is coupled with the second actuator and the second switch of the container. The transport vehicle may also include a door sensor to detect an opening and/or a closing of a door of the container.

BRIEF DESCRIPTION OF DRAWINGS

Example embodiments are illustrated by way of example and not limitation in the figures of the accompanying drawing, in which like references indicate similar elements and in which.

Other features of the present embodiments will be apparent from the accompanying drawings and from the detailed description that follows.

DETAILED DESCRIPTION

Example embodiments, as described below, may be used to provide a method, a system, and/or an apparatus of implementing a switch and an actuator coupling in a chassis of a container associated with an intermodal freight transport system, according to one or more embodiments.

According to one embodiment, a method of an intermodal transport tracking system includes placing a first switch 102 and a first actuator 104 of a housing 105 of a chassis 100, coupling (e.g., the coupling 101A of FIG. 1) the first switch 102 of the housing 105 of the chassis 100 to a second actuator 108 of a container 106, coupling (e.g., the coupling 101B of FIG. 1) the first actuator 104 of the housing 105 of the chassis 100 to a second switch 110 of the container 106 when the container 106 is placed on the chassis 100, and/or signaling a wake event 200 to a container tracking device 112 when the first switch 102 and the first actuator 104 of the chassis 100 is coupled with the second actuator 108 and the second switch 110 of the container 106.

In another embodiment, a method of an intermodal transport tracking system includes signaling a wake event 200 to a container tracking device 112 when the first switch 102 and the first actuator 104 of the chassis 100 is coupled (e.g., the coupling 101A and the coupling 101B of FIG. 1) with the second actuator 108 and the second switch 110 of the container 106; generating, through a global positioning system 204 (GPS 204) of a container tracking device 112 and a global positioning system 206 (GPS 206) of the chassis tracking device 114 and reading an identification tag 118 of the container 106 through a container reader 116 of the chassis 100 to discover a container identification number 302 when the first switch 102 and the first actuator 104 of the chassis is coupled with the second actuator 108 and the second switch 110 of the container 106.

In yet another embodiment, a transport vehicle includes a chassis 100 having a first switch 102 and a first actuator 104, a container 106 having a second switch 110 and a second actuator 108, and a container tracking device 112 to power on when the first switch 102 and the first actuator 104 of the chassis 100 are coupled with the second switch 110 and the second actuator 108 of the container 106.

Figure 1:
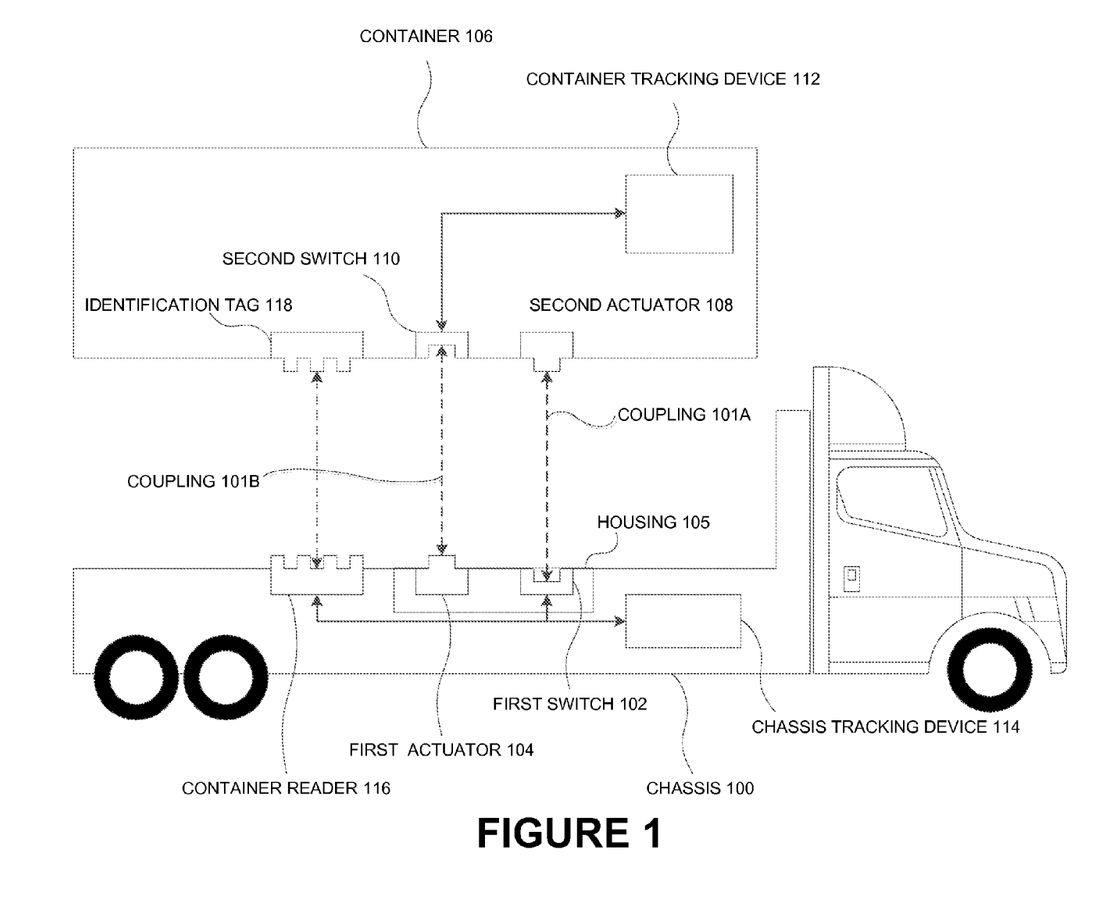
FIG. 1 is a schematic view illustrating a coupling of a container to a chassis pulled by a truck tractor, according to one embodiment.

FIG. 1 is a schematic view illustrating a coupling of a container 106 to a chassis 100 pulled by a truck tractor, according to one embodiment. Particularly, FIG. 1 depicts a coupling 101A of a first switch 102 of a housing 105 of a chassis 100 to a second actuator 108 of the container 106 when the container 106 is placed on the chassis 100. In addition, FIG. 1 depicts a coupling 101B of a second switch 110 of the container 106 to a first actuator 104 of a housing 105 of the chassis 100 when the container 106 is placed on the chassis 100. The chassis 100 may provide a capability to mount a container 106. The container 106 may be a standard, reusable steel box used to safely, efficiently, and/or securely transport a shipment of goods distributed through an intermodal freight transport system. The chassis 100 may be a secure container docking trailer associated with an intermodal transport vehicle (e.g., a railcar, a truck) as part of an intermodal freight transport system.

A switch (e.g. a first switch 102, a second switch 110) may be an electrical component that, when trigged by an actuator (e.g. a first actuator 104, a second actuator 108), may complete or interrupt an electrical circuit. The switch may be a magnetic switch or a pressure switch. The actuator may be a magnet in the case of a magnetic switch or an application of pressure by the container 106 in the case of a pressure switch. The switch may be designed to activate (e.g. through a wake event 200 of FIG. 2) a number of electrical devices (e.g., the container tracking device 112, the chassis tracking device 114, the container reader 116 of FIG. 1) associated with the circuit when the switch is coupled to an appropriate actuator.

Figure 2:
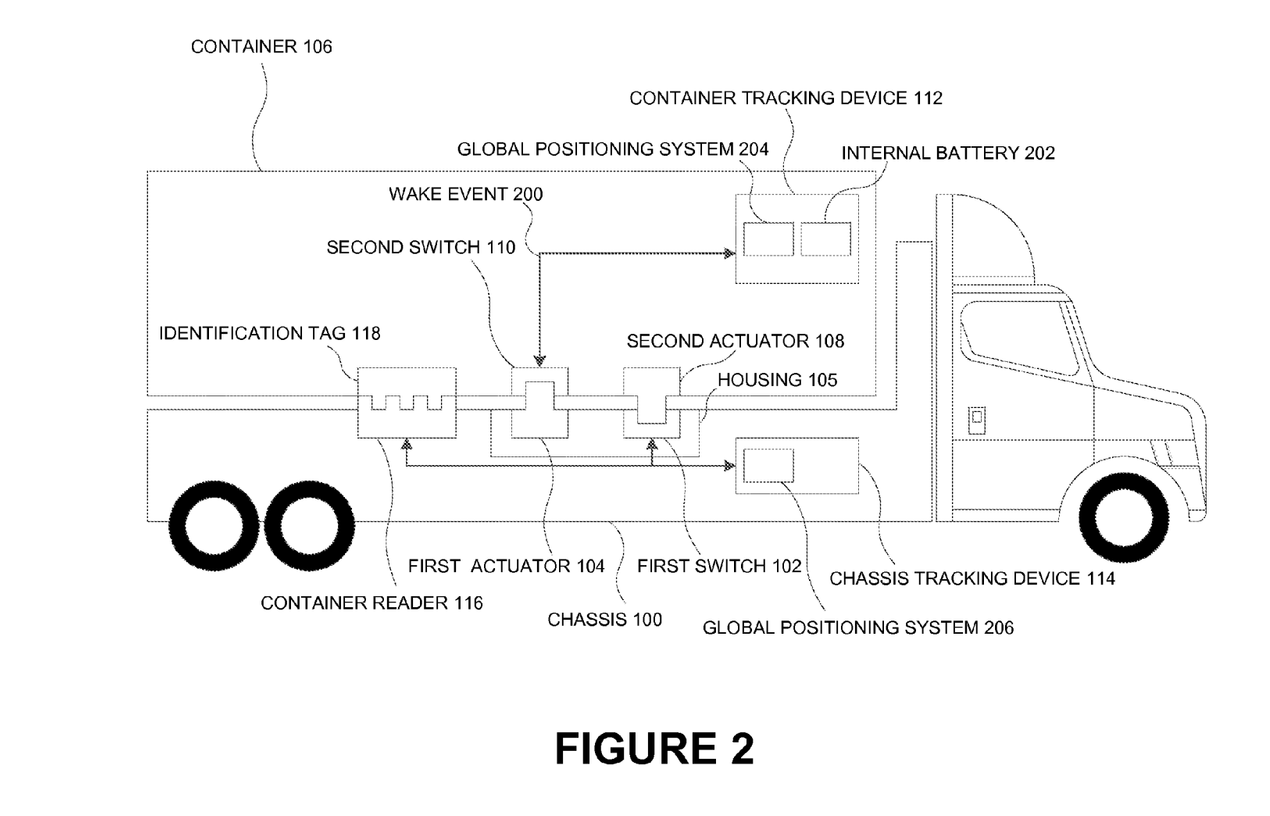
FIG. 2 is a schematic view illustrating an activation of a container reader of a chassis, a container tracking device and a chassis tracking device based on the coupling, of FIG. 1, of the container to the chassis, according to one embodiment.

FIG. 2 is a schematic view illustrating an activation of a container reader 116 of a chassis 100, a container tracking device 112, and/or a chassis tracking device 114 based on the coupling, of FIG. 1, of the container 106 to the chassis 100, according to one embodiment. Particularly, FIG. 2 illustrates signaling a wake event 200 to a container tracking device 112 when the first switch 102 and the first actuator 104 of the chassis 100 is coupled with the second actuator 108 and the second switch 110 of the container 106. The container tracking device 112 may be a self-powered telemetry device designed to power on based on the signaling of the wake event 200 in FIG. 2. The container tracking device 112 may include an internal battery 202 and a GPS 204.

Figure 7:
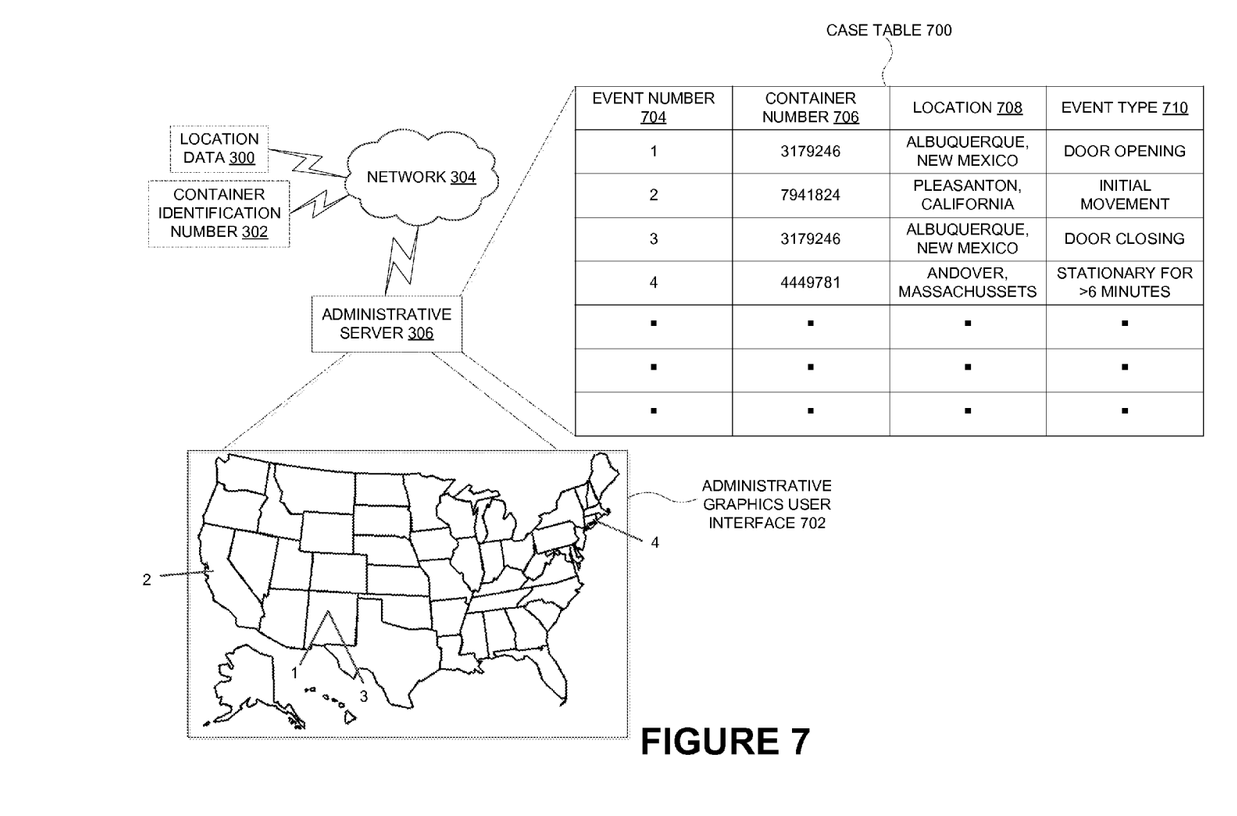
FIG. 7 depicts an administrative view of a case table listing a plurality of communication events associated with an intermodal freight transport system and a graphics user interface view illustrating a geographical origin of the events based on the communication of FIG. 3 of a location data and a container identification number to an administrative server through the network, according to one embodiment.

FIG. 2 illustrates powering the container tracking device 112 through an internal battery 202 of the container tracking device 112 based on the wake event 200. Furthermore, FIG. 2 also depicts activating a chassis tracking device 114 and a container reader 116 of the chassis when the first switch 102 of the chassis 100 is coupled with the second actuator 108 of the container 106. The chassis tracking device 114 and the container reader 116 may receive power (e.g., 7-way power) from a transport vehicle associated with the chassis 100. The chassis tracking device 114 may also include a GPS 206. A global positioning system (e.g., the GPS 204, the GPS 206) may be an integrated space-based satellite system that provides location and time information of at least one of the container 106 and the chassis 100 to an administrative server 306 to be displayed through an administrative graphics user interface 702, as shown in FIG. 7.

A container reader 116 may be a radio frequency identification scanner or an optical scanner designed to gather data from a tag (e.g., the identification tag 118 of FIG. 1) attached to an object. The container reader 116 may receive power (e.g., 7-way power) from a transport vehicle associated with the chassis 100. The container reader 116 may be activated by the coupling 101A of the second actuator 108 of the container 106 to the first switch 102 of the chassis 100. The container reader 116 may be configured to read an identification tag 118 of the container 106 to discover a container identification number 302 based on the coupling 101A of the second actuator 108 of the container 106 to the first switch 102 of the chassis 100.

Figure 3:
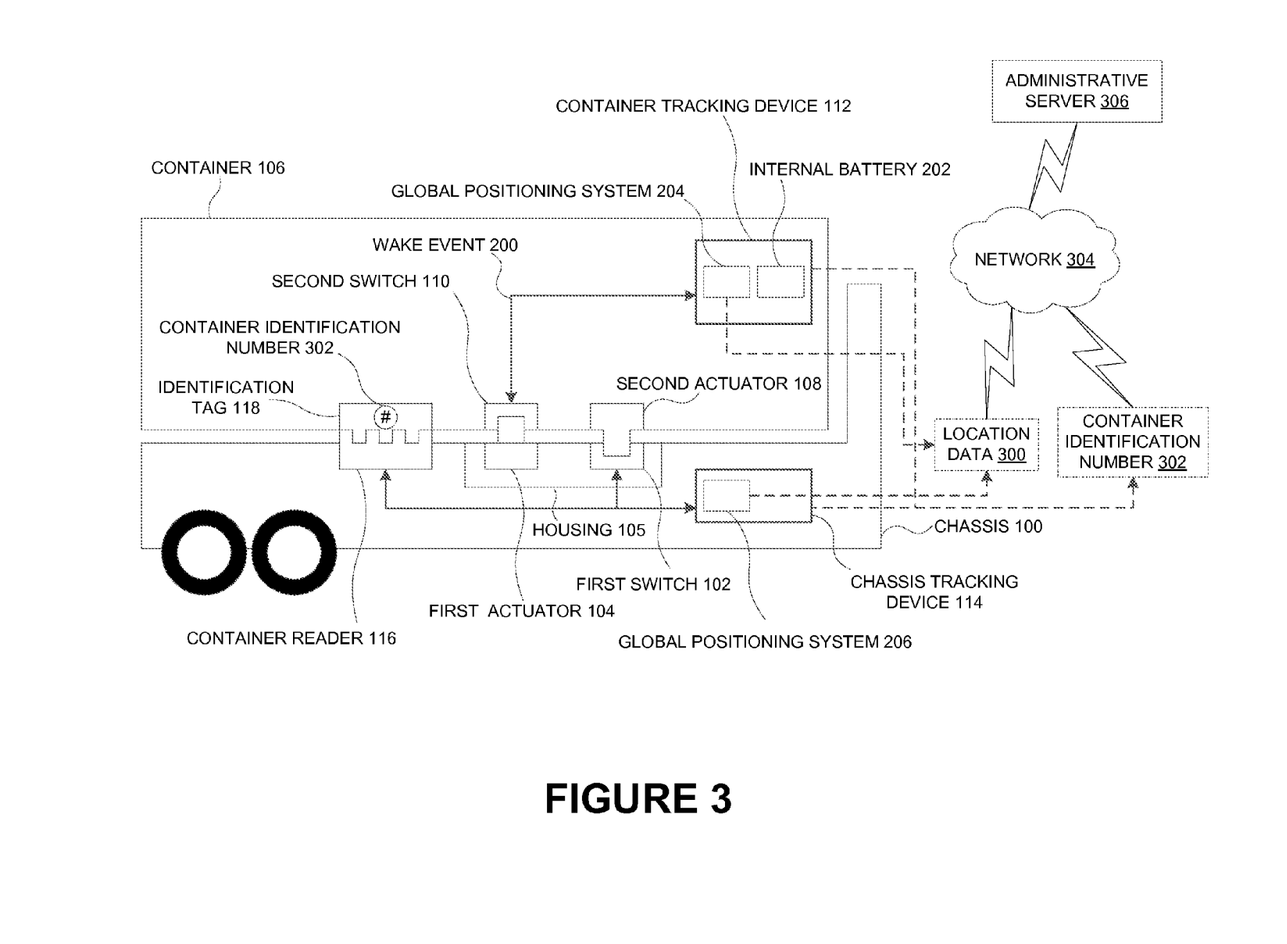
FIG. 3 is schematic view illustrating a communication of a location data and a container identification number to an administrative server through a network by at least one of the container tracking device and the chassis tracking device of FIG. 2, according to one embodiment.

FIG. 3 is schematic view illustrating a communication of a location data 300 and a container identification number 302 to an administrative server 306 through a network 304 by at least one of a container tracking device 112 and a chassis tracking device 114 of FIG. 2, according to one embodiment. Specifically, FIG. 3 illustrates generating, through a GPS 204 or a GPS 206 of at least one of the container tracking device 112 and the chassis tracking device 114, a location data 300 when the first switch 102 and the first actuator 104 of the chassis 100 is coupled with the second actuator 108 and the second switch 110 of the container 106. In addition, FIG. 3 also illustrates reading an identification tag 118 of the container 106 through a container reader 116 of the chassis 100 to discover a container identification number 302 when the first switch 102 and the first actuator 104 of the chassis 100 is coupled with the second actuator 108 and the second switch 110 of the container 106. Furthermore, FIG. 3 also illustrates communicating the location data 300 and the container identification number 302 through at least one of the container tracking device 112 and the chassis tracking device 114, through a network 304, to an administrative server 306.

The network 304 (e.g., WAN, mobile, telecommunications, internet, intranet, and/or ZigBee network) may enable communication between the container tracking device and the administrative server 306 and between the chassis tracking device 114 and the administrative server 306. The administrative server 306 may be a remote processing and storage device associated with an intermodal freight transport system. The administrative server 306 may aggregate the location data 300 and the container identification number 302 of a multiplicity of containers in a case table 700 and may geographically display the location of the multiplicity of containers through an administrative graphics user interface 702 of the administrative server 306, as shown in FIG. 7.

Referring to FIG. 7, depicted is an administrative view of a case table 700 listing a plurality of communication events associated with an intermodal freight transport system and an administrative graphics user interface view 702 illustrating a geographical origin of the events based on the communication, of FIG. 3, of a location data 300 and a container identification number 302 to an administrative server 306 through the network 304, according to one embodiment. The case table 700 may designate an event number 704, a container number 706, a location 708, and/or an event type 710. The event number 704 may indicate a chronological order of the events. The container number 706 may be based on a container identification number 302 discovered through a container reader 116 reading an identification tag 118 of a container 106. The location 708 may be based on a location data 300 generated by a GPS 204 of the container tracking device 112 and/or a GPS 206 of the chassis tracking device 114 when a first switch 102 and a first actuator 104 of the chassis 100 are coupled with the second actuator 108 and the second switch 110 of the container 106. The event type 710 may be based on any of a plurality of events associated with the chassis 100 (e.g., an initial movement 402, a duration 406 of continuous movement 404, a duration 410 of a stationary condition 408 of FIG. 4) and/or the container 106 (e.g., an opening 500 of a door 504 of the container 106, a closing 502 of the door 504 of the container of FIG. 5).

Figure 4:
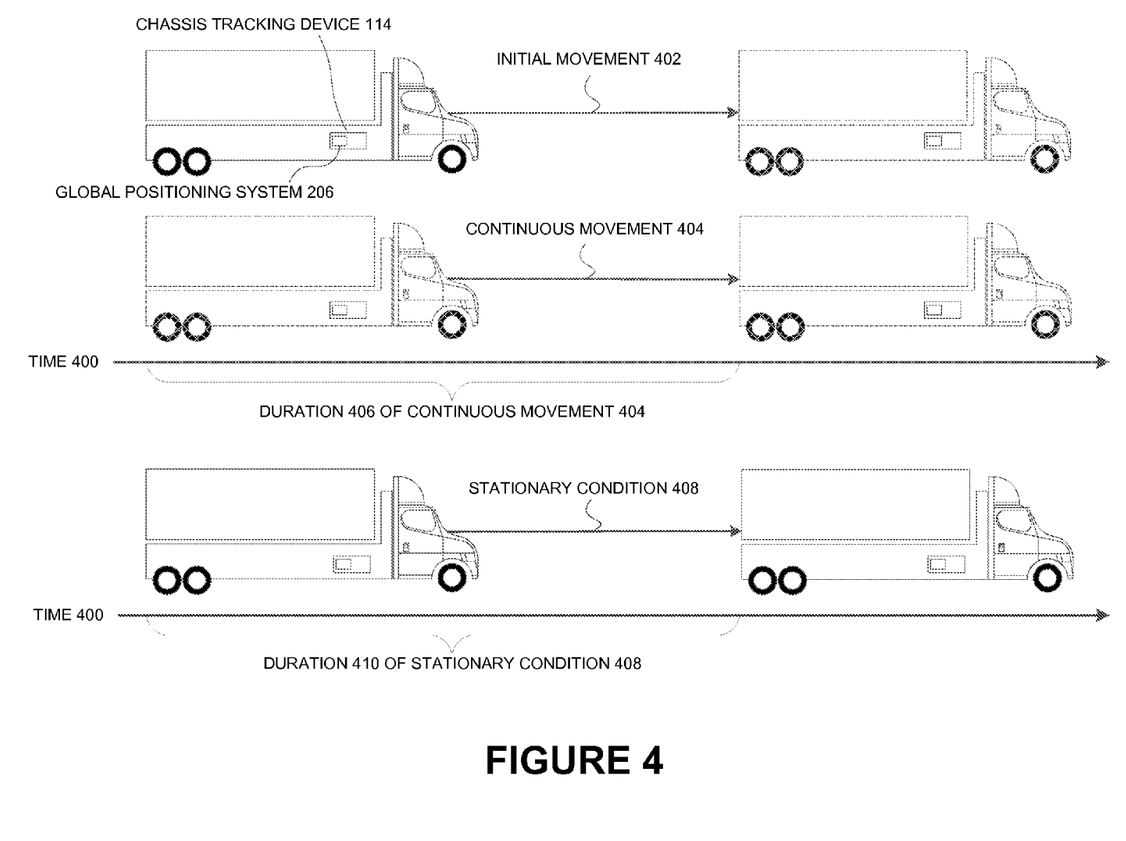
FIG. 4 is a time lapse diagram depicting a detection of an initial movement of the chassis of FIG. 1 and a calculation of a duration of continuous movement of the chassis and a duration of a stationary condition of the chassis, according to one embodiment.

FIG. 4 is a time lapse diagram depicting a detection of an initial movement 402 of the chassis 100 of FIG. 1 and a calculation of a duration 406 of continuous movement 404 of the chassis and a duration 410 of a stationary condition 408 of the chassis 100 with respect to time 400, according to one embodiment. Particularly, FIG. 4 involves detecting an initial movement 402 of the chassis 100 through the GPS 206 of the chassis tracking device 114, determining a duration 406 of a continuous movement 404 of the chassis 100 through the GPS 206 of the chassis tracking device 114, and/or calculating a duration 410 of a stationary condition 408 of the chassis 100 through the GPS 206 of the chassis tracking device 114.

Figure 6:
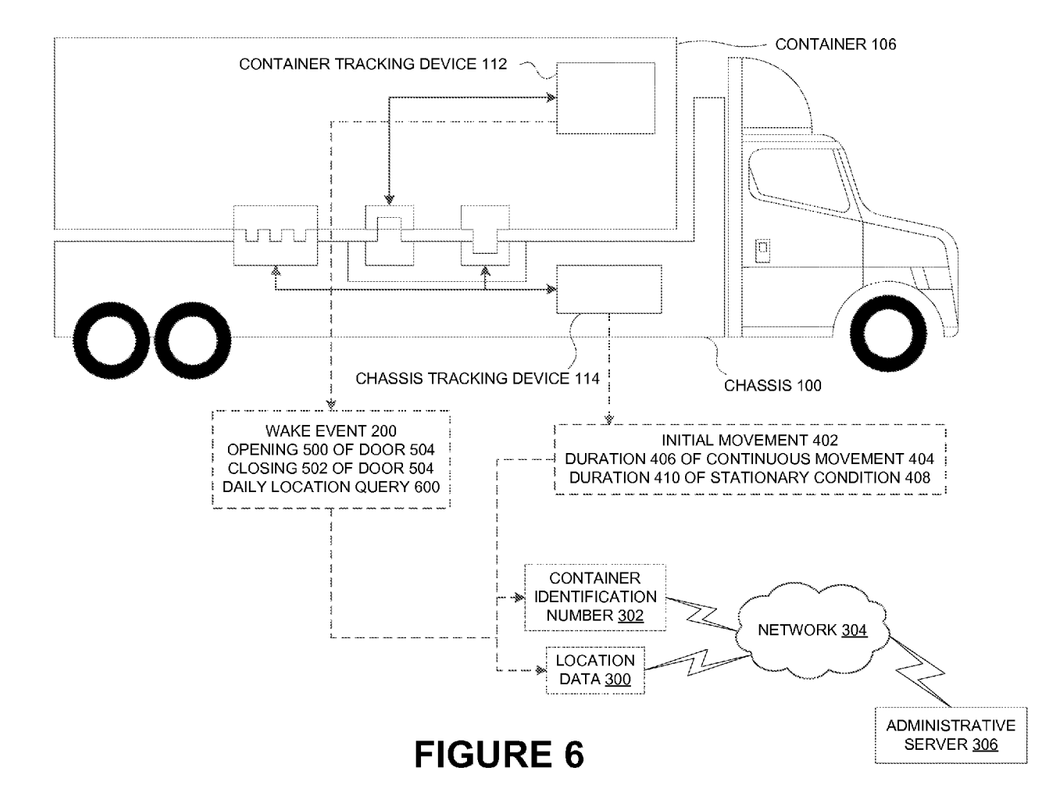
FIG. 6 illustrates a communication of a container tracking device and a chassis tracking device of FIG. 1 to an administrative server of FIG. 3 through a network based on a set of events triggering the communication, according to one embodiment.

According to one embodiment, an initial movement 402, a duration 406 of a continuous movement 404, and/or a duration 410 of a stationary condition 408 may trigger a communication, through the chassis tracking device 114 of the chassis 100, of a location data 300 generated by a GPS 206 of the chassis tracking device 114 and a container identification number 302 detected through a container reader 116 of the chassis 100, to an administrative server 306 through a network 304, as shown in FIG. 6.

The initial movement 402 may be any movement after a duration of rest. The initial movement 402 may journey indicate an onset of a delivery route of the chassis 100 for the purpose of tracking the container 106 coupled to the chassis 100. The determined duration 406 of a continuous movement 404 may indicate a continuation of the delivery route of the chassis 100 for the purpose of tracking the container 106 coupled to the chassis 100. The calculated duration 410 of a stationary condition 408 may indicate an end of the route of the chassis 100 for the purpose of tracking the container 106 coupled to the chassis 100. The GPS 206 of the chassis tracking device 114 may register a movement of the chassis 100 by detecting a change in the position of the chassis 100.

Figure 5:
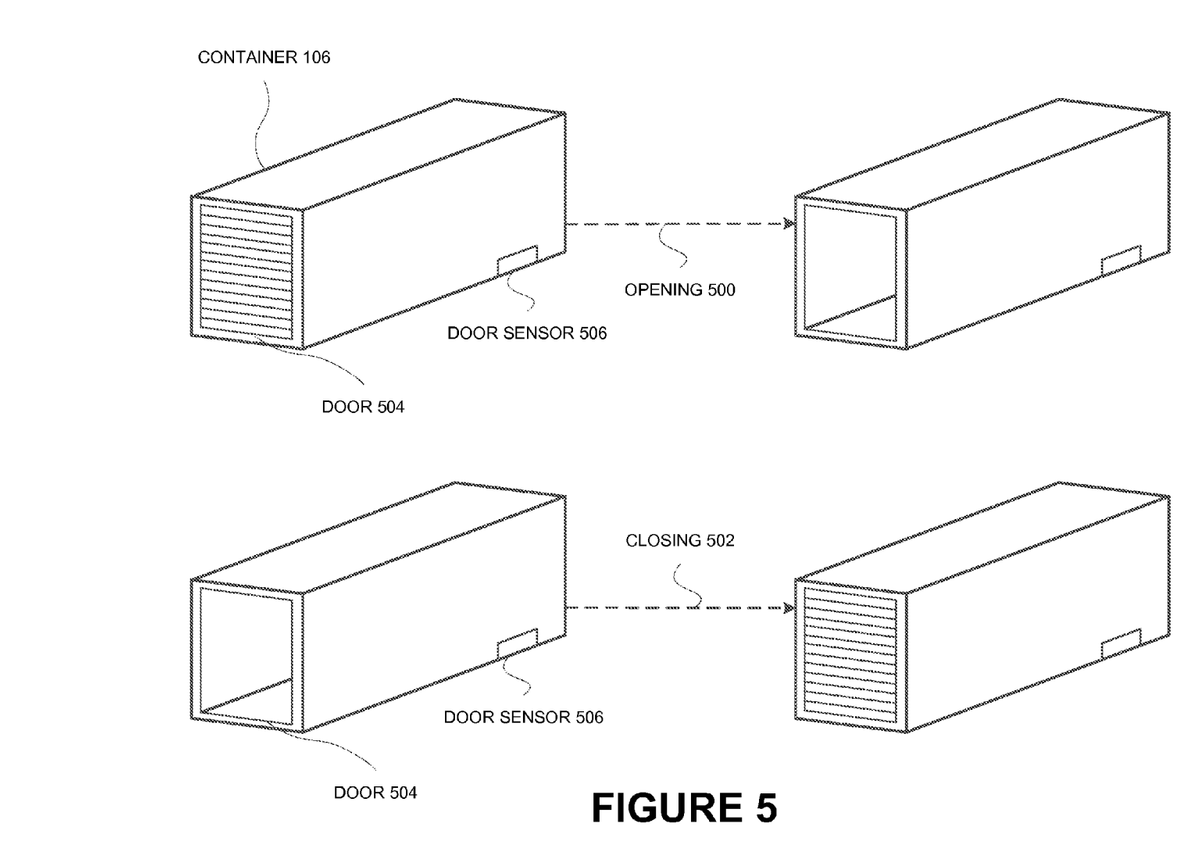
FIG. 5 portrays an opening and a closing of a door of a container as detected through a door sensor of the container of FIG. 1, according to one embodiment.

FIG. 5 portrays an opening 500 and a closing 502 of a door 504 of a container 106 as detected through a door sensor 506 of the container 106 of FIG. 1, according to one embodiment. An opening 500 and a closing 502 of a door 504 of a container 106 may be an event of interest to a client of an intermodal freight transport business.

According to one embodiment, an opening 500 and a closing 502 of a door 504 of a container 106 may trigger a communication, through the container tracking device 112 of the container 106, of a location data 300 of the container 106 generated by a GPS 204 of the container tracking device 112, to an administrative server 306 using a network 304, as shown in FIG. 6.

According to another embodiment, an opening 500 and a closing 502 of a door 504 of a container 106 may trigger a communication, through the container tracking device 112 of the container 106, of a location data 300 of the container 106 generated by a GPS 204 of the container tracking device 112 and a container identification number 302 discovered through a container reader 116 of the chassis 100, to an administrative server 306 using a network 304, as shown in FIG. 6.

FIG. 6 illustrates a communication of a container tracking device 112 and a chassis tracking device 114 to an administrative server 306 through a network 304 based on a set of events triggering the communication, according to one embodiment. The container tracking device 112 and the chassis tracking device 114 may communicate with an administrative server 306 based on a set of events triggering the communication. The container tracking device 112 may communicate, through a network 304, the location data 300 to an administrative server 306 based on at least one of a wake event 200, an opening 500 of a door 504 of the container 106, a closing of the door 504 of the container 106, and/or a daily location query 600. The chassis tracking device 114 may communicate, through a network 304, the location data 300 and a container identification number 302 of the container 106 to an administrative server 306 based on a detection of an initial movement 402 of the chassis 100, a duration 406 of continuous movement 404 (e.g., every 10 minutes of continuous movement 404), a duration 410 of a stationary condition 408 (e.g., after 6 minutes of a stationary condition 408).

Figure 8:
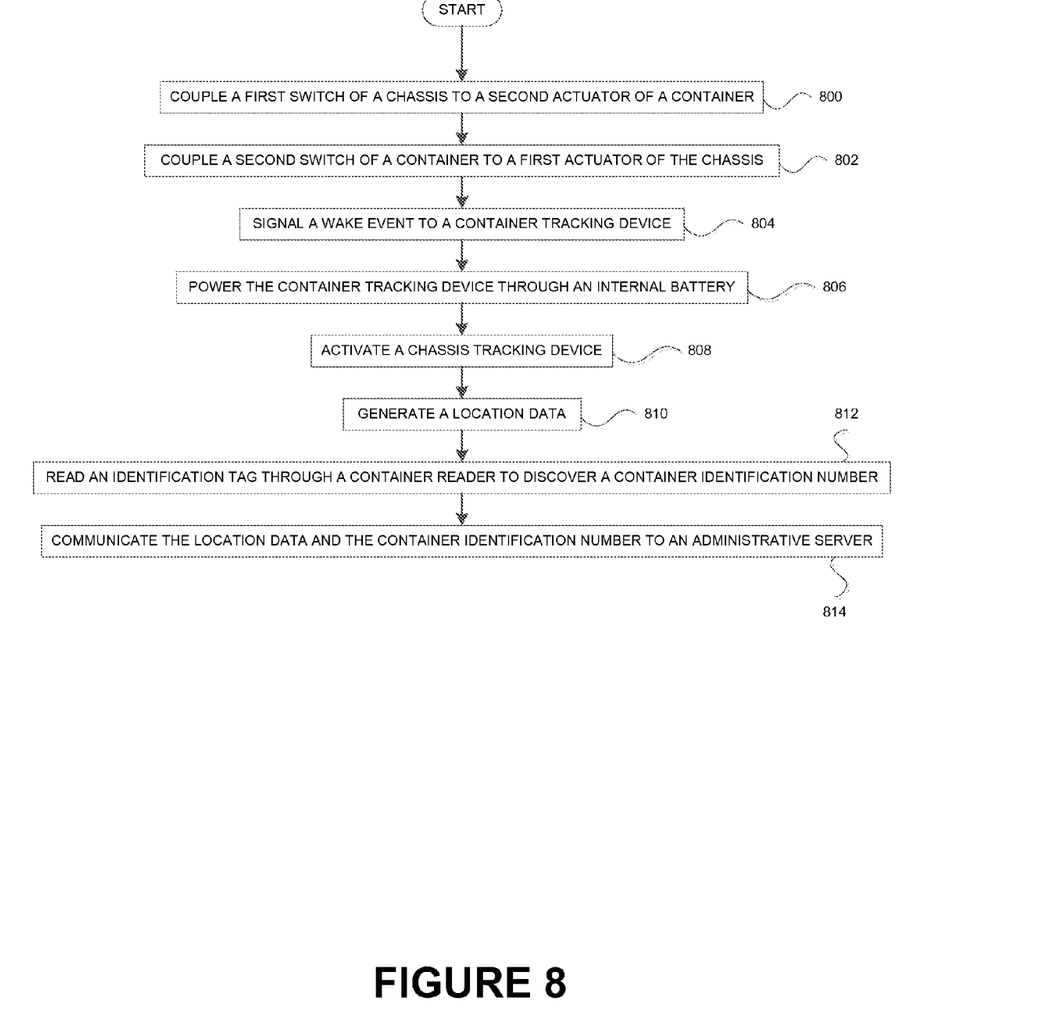
FIG. 8 is a process flow chart outlining the coupling, of FIG. 1, of a container and a chassis and a subsequent communication of a location data and a container identification number to an administrative server through at least one of a container tracking device and a chassis tracking device, according to one embodiment.

FIG. 8 is a process flow chart outlining the coupling of FIG. 1, of a container 106 and a chassis 100 of and a subsequent communication of a location data 300 and a container identification number 302 to an administrative server 306 through at least one of a container tracking device 112 and a chassis tracking device 114, according to one embodiment. In operation 800, a first switch 102 of a chassis 100 is coupled to a second actuator 108 of a container 106. In operation 802, a second switch 110 of the container 106 is coupled to a first actuator 104 of the chassis 100. In operation 804, a wake event 200 is signaled to a container tracking device 112. In operation 806, the container tracking device 112 is powered through an internal battery 202. In operation 808, a chassis tracking device 114 is activated. In operation 810, a location data 300 is generated. In operation 812, an identification tag 118 is read through a container reader 116 to discover a container identification number 302. In operation 814, the location data 300 and the container identification number 302 are communicated to an administrative server 306.

Figure 9:
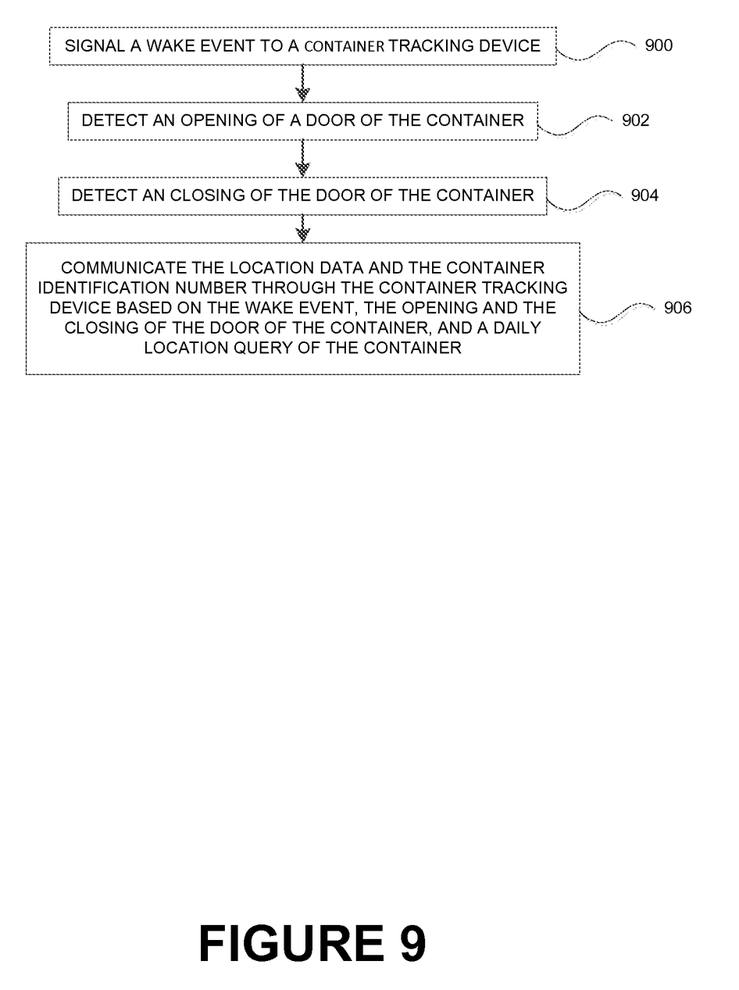
FIG. 9 is a process flow chart describing a set of events triggering the communication of FIG. 3 of a location data and a container identification number to an administrative server through a container tracking device, according to one embodiment.

FIG. 9 is a process flow chart describing a set of events triggering the communication of FIG. 3 of a location data 300 and a container identification number 302 to an administrative server 306 through a container tracking device 112, according to one embodiment. In operation 900, a wake event 200 is signaled to a container tracking device 112. In operation 902, an opening 500 of a door 504 of the container 106 is detected. In operation 904, a closing 502 of the door 504 of the container 106 is detected. In operation 906, a location data 300 and a container identification number 302 is communicated through the container tracking device 112 based on the wake event 200, the opening 500 and the closing 502 of the door 504 of the container 106, and/or a daily location query 600 of the container 106.

Figure 10:
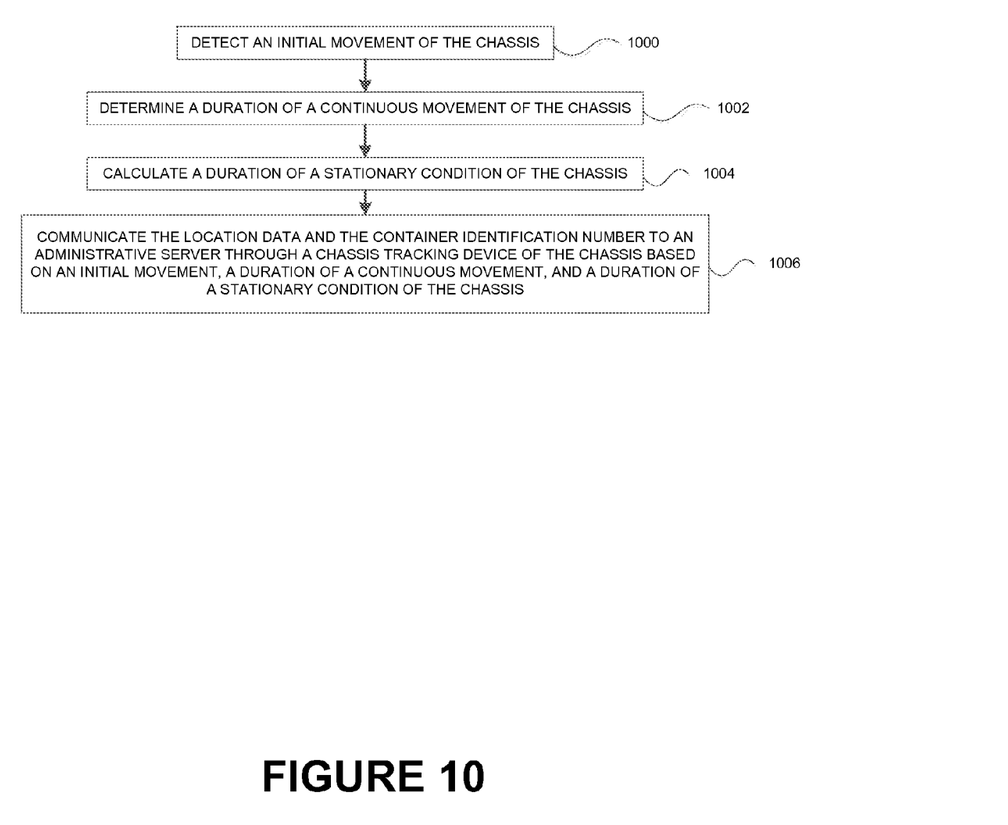
FIG. 10 is a process flow chart describing a set of events triggering a communication of a location data and a container identification number to an administrative server through a chassis tracking device, according to one embodiment.

FIG. 10 is a process flow chart describing a set of events triggering a communication of a location data 300 and a container identification number 302 to an administrative server 306 through a chassis tracking device 114, according to one embodiment. In operation 1000, an initial movement 402 of the chassis 100 is detected. In operation 1002, a duration 406 of a continuous movement 404 of the chassis 100 is determined. In operation 1004, a duration 410 of a stationary condition 408 of the chassis 100 is calculated. In operation 1006, a location data 300 and a container identification number 302 is communicated to an administrative server 306 through a chassis tracking device 114 based on an initial movement 402, a duration 406 of a continuous movement 404, and/or a duration 410 of a stationary condition 408 of the chassis 100.

An example will now be described in which the various embodiments will be explained in a hypothetical scenario. A distribution business named 'XYZ Distributors' may wish to track containers carrying shipments of goods to their respective destinations. Also, XYZ Distributor may have more containers than the numbers of tractors able to pull them. As such, XYZ Distributors may wish to separately track containers as well as chassis units. Additionally, a client of XYZ Distributors, named 'Brian', may wish to receive regular updates of the location of his shipment(s). In order to facilitate these regular updates, XYZ Distributors may wish to deploy tracking devices to track the container and the chassis, separated or not.

The tracking device of the container may trigger automatically daily, when the door of the container opens or closes, and/or when the container mounts to a chassis. The tracking device of the chassis may trigger based on a detection of movement of the chassis. For example, the chassis may be tracked when the chassis starts to move, when it continues to move for a specific duration, and/or when it stops moving for a specific duration. Mounting the container to the chassis may activate a container reader of the chassis. The container may read a tag on the container to identify a unique number associated with the container. The tracking devices may utilize a global positioning system to track the locations of the container and the chassis.

The tracking devices may transmit location data and/or container identification data to an administrative server associated with XYZ Distributors. When separated from the chassis, containers may be stored for a prolonged period of time. As such, a communication of the container's identification may help XYZ Distributors locate the whereabouts of specific missing or misplaced containers.

The administrative server may aggregate received data to generate a case table listing the data and an administrative graphical user interface displaying the data on a map. As such, Brian may access a personalized view of the graphical user interface for the purpose of tracking a shipment of containers being distributed by XYZ Distributor.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and/or software (e.g., embodied in a machine readable medium). For example, the various electrical structure and methods may be embodied using transistors, logic gates, and/or electrical circuits (e.g., application specific integrated (ASIC) circuitry and/or Digital Signal Processor (DSP) circuitry).

In addition, it will be appreciated that the various operations, processes, and/or methods disclosed herein may be embodied in a machine-readable medium and/or a machine accessible medium compatible with a data processing system (e.g., a computer device). Accordingly, the specification and drawings are to be regarded in an illustrative in rather than a restrictive sense.

What is claimed is:

1. A method, comprising:
placing a first switch and a first actuator of a housing of a chassis;
coupling the first switch of the housing of the chassis to a second actuator of a container and coupling the first actuator of the housing of the chassis to a second switch of the container when the container is placed on the chassis;
signaling a wake event to a container tracking device when the first switch and the first actuator of the chassis is coupled with the second actuator and the second switch of the container;
activating a chassis tracking device when the first switch and the first actuator of the chassis is coupled with the second actuator and the second switch of the container;
detecting an initial movement of the chassis through a Global Positioning System (GPS) of at least one of the container tracking device and the chassis tracking device;
determining a duration of a continuous movement of the chassis through the GPS of the at least one of the container tracking device and the chassis tracking device; and
calculating a duration of a stationary condition of the chassis through the GPS of the at least one of the container tracking device and the chassis tracking device.

2. The method of claim 1, further comprising:
powering the container tracking device through an internal battery of the container tracking device based on the wake event.

3. The method of claim 1, further comprising:
generating, through the GPS of the at least one of the container tracking device and the chassis tracking device, a location data when the first switch and the first actuator of the chassis is coupled with the second actuator and the second switch of the container;
reading an identification tag of the container through a container reader of the chassis to discover a container identification number when the first switch and the first actuator of the chassis is coupled with the second actuator and the second switch of the container; and
communicating the location data and the container identification number through the at least one of the container tracking device and the chassis tracking device, through a network, to an administrative server.

4. The method of claim 3, further comprising:
detecting at least one of an opening and a closing of a door of the container through a door sensor of the container.

5. The method of claim 4, further comprising at least one of:
communicating the location data and the container identification number through the container tracking device based on the at least one of the opening and the closing of the door of the container; and
communicating the location data and the container identification number through the container tracking device based on a daily location query of the container tracking device.

6. The method of claim 5, wherein at least one of:
the location data and the container identification number are communicated through the container tracking device based on at least one of the wake event, the at least one of the opening and the closing of the door, and the daily location query of the container tracking device, and
the location data and the container identification number are communicated through the chassis tracking device based on at least one of the initial movement of the chassis, the duration of the continuous movement of the chassis, and the duration of the stationary condition of the chassis.

7. A method, comprising:
signaling a wake event to a container tracking device when a first switch and a first actuator of a chassis is coupled with a second actuator and a second switch of a container;
activating a chassis tracking device when the first switch and the first actuator of the chassis is coupled with the second actuator and the second switch of the container;

generating, through a GPS of at least one of the container tracking device and the chassis tracking device, a location data when the first switch and the first actuator of the chassis is coupled with the second actuator and the second switch of the container;

reading an identification tag of the container through a container reader of the chassis to discover a container identification number when the first switch and the first actuator of the chassis is coupled with the second actuator and the second switch of the container;

detecting an initial movement of the chassis through the GPS of the at least one of the container tracking device and the chassis tracking device;

determining a duration of a continuous movement of the chassis through the GPS of the at least one of the container tracking device and the chassis tracking device; and calculating a duration of a stationary condition of the chassis through the GPS of the at least one of the container tracking device and the chassis tracking device.

8. The method of claim 7, further comprising:
powering the container tracking device through an internal battery of the container tracking device based on the wake event.

9. The method of claim 7, further comprising:
transmitting the location data and the container identification number through the at least one of the container tracking device and the chassis tracking device, through a network, to an administrative server.

10. The method of claim 9, further comprising:
detecting at least one of an opening and a closing of a door of the container through a door sensor module of the container.

11. The method of claim 10, further comprising at least one of:
communicating the location data and the container identification number through the container tracking device based on the at least one of the opening and the closing of the door of the container; and
communicating the location data and the container identification number through the container tracking device based on a daily location query of the container tracking device.

12. The method of claim 11, wherein at least one of:
the location data and the container identification number are transmitted through the container tracking device based on at least one of the wake event, the at least one of the opening and the closing of the door, and the daily location query of the container tracking device, and
the location data and the container identification number are transmitted through the chassis tracking device based on at least one of the initial movement of the chassis, the duration of the continuous movement of the chassis, and the duration of the stationary condition of the chassis.

13. A transport vehicle, comprising:
a chassis having a first switch and a first actuator;
a container having a second switch and a second actuator, the first switch of the chassis being configured to be coupled to the second actuator of the container, and the first actuator of the chassis being configured to be coupled to the second switch of the container when the container is placed on the chassis;
a container tracking device to power on when the first switch and the first actuator of the chassis are coupled with the second switch and the second actuator of the container, the first switch and the first actuator of the chassis being coupled with the second actuator and the second switch of the container signaling a wake event to the container tracking device;
a chassis tracking device configured to be activated when the first switch and the first actuator of the chassis is coupled with the second actuator and the second switch of the container; and
a GPS of at least one of the container tracking device and the chassis tracking device to detect an initial movement of the chassis, to determine a duration of a continuous movement of the chassis, and to calculate a duration of a stationary condition of the chassis.

14. The transport vehicle of claim 13, wherein the container tracking device is powered by an internal battery thereof.

15. The transport vehicle of claim 13,
wherein:
the GPS of the at least one of the container tracking device and the chassis tracking device is configured to generate a location data when the first switch and the first actuator of the chassis is coupled with the second actuator and the second switch of the container, and
the transport vehicle further comprises a container reader of the chassis to read an identification tag of the container to discover a container identification number when the first switch and the first actuator of the chassis is coupled with the second actuator and the second switch of the container.

16. The transport vehicle of claim 15, wherein the container tracking device and the chassis tracking device communicate with:
an administrative server to receive a communication comprising the location data and the container identification number when the first switch and the first actuator of the chassis is coupled with the second actuator and the second switch of the container.

17. The transport vehicle of claim 13, further comprising a door sensor to detect at least one of an opening and a closing of a door of the container.

\* \* \* \* \*